(12) United States Patent
Brown et al.

(10) Patent No.: US 10,793,076 B2
(45) Date of Patent: Oct. 6, 2020

(54) STORAGE TRAYS AND SEAT ASSEMBLIES HAVING STORAGE TRAYS

(71) Applicant: Toyota Motor Engineering & Manufacturing North America, Inc., Plano, TX (US)

(72) Inventors: Shelby Leigh Brown, Brighton, MI (US); Hamshivraj Dhamrat, Saline, MI (US); Lindsay A. Babian, Canton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/263,988

(22) Filed: Jan. 31, 2019

(65) Prior Publication Data

US 2020/0247324 A1 Aug. 6, 2020

(51) Int. Cl.
*B60R 7/04* (2006.01)

(52) U.S. Cl.
CPC ................... *B60R 7/043* (2013.01)

(58) Field of Classification Search
CPC ........ B60N 3/06; B60N 2/3047; B60N 2/206; B60N 2/305; B60N 2/68; B60N 3/004; B60R 7/043
See application file for complete search history.

(56) References Cited

U.S. PATENT DOCUMENTS

| | | | | | |
|---|---|---|---|---|---|
| 4,883,317 | A | * | 11/1989 | Davenport | A47C 7/62 297/188.1 |
| 5,622,404 | A | * | 4/1997 | Menne | A47C 4/52 297/188.1 |
| 5,816,650 | A | * | 10/1998 | Lucas, Jr. | B60N 2/3045 297/188.1 |
| 5,902,009 | A | * | 5/1999 | Singh | B60N 2/90 297/188.1 |
| 5,951,084 | A | * | 9/1999 | Okazaki | B60N 2/06 296/37.16 |
| 5,967,602 | A | * | 10/1999 | Ptak | B60N 2/90 297/188.11 |
| 6,027,164 | A | * | 2/2000 | Jakubiec | B60N 2/68 297/188.01 |
| 6,059,358 | A | * | 5/2000 | Demick | B60N 2/206 297/125 |

(Continued)

FOREIGN PATENT DOCUMENTS

| | | |
|---|---|---|
| CN | 202180783 U | 4/2012 |
| CN | 103738249 B | 10/2015 |

(Continued)

*Primary Examiner* — Brian D Nash
(74) *Attorney, Agent, or Firm* — Dinsmore & Shohl LLP

(57) ABSTRACT

A storage tray for a seat assembly having a seat cushion pivotally coupled to a frame. The frame including a pair of side shields and a frame member that extends between the pair of side shields. The storage tray comprises a tray portion having a front lip, a rear wall, and a pair of side wall portions. The front lip, the rear wall, and the pair of side wall portions define a storage area The tray portion is disposed between and coupled to the pair of side shields by a tab that extends outwardly from each of the pair of side wall portions. The tray portion is coupled to the frame member by a hook that extends outwardly from the rear wall.

10 Claims, 3 Drawing Sheets

(56) References Cited

U.S. PATENT DOCUMENTS

| | | | | |
|---|---|---|---|---|
| 6,074,000 A * | 6/2000 | Wagner | ............... | A47C 7/62 |
| | | | | 297/188.08 |
| 6,102,463 A * | 8/2000 | Swanson | ............... | B60N 2/3013 |
| | | | | 296/37.15 |
| 6,161,896 A * | 12/2000 | Johnson | ............... | B60R 7/043 |
| | | | | 297/188.08 |
| 6,203,104 B1 | 3/2001 | Matsuo | ............... | B60N 2/3013 |
| | | | | 297/188.1 |
| 6,386,612 B2 * | 5/2002 | Hofmann | ............... | B60R 7/043 |
| | | | | 224/275 |
| 6,390,547 B1 * | 5/2002 | Spykerman | ............... | B60N 2/3047 |
| | | | | 296/37.15 |
| 6,419,313 B1 * | 7/2002 | Newman | ............... | B60N 2/70 |
| | | | | 296/37.15 |
| 6,540,279 B1 * | 4/2003 | Bargiel | ............... | B60R 7/043 |
| | | | | 296/37.15 |
| 6,877,807 B2 * | 4/2005 | Mizuno | ............... | B60N 2/305 |
| | | | | 297/188.08 |
| 7,014,242 B2 | 3/2006 | Kim | | |
| 7,121,606 B2 * | 10/2006 | Khan | ............... | B60R 7/043 |
| | | | | 296/37.15 |
| 7,240,943 B2 * | 7/2007 | Williamson | ............... | B60R 7/043 |
| | | | | 224/275 |
| 7,517,014 B2 * | 4/2009 | Schroeder | ............... | B64D 11/06 |
| | | | | 244/118.1 |
| 7,523,985 B2 * | 4/2009 | Bhatia | ............... | B60N 2/206 |
| | | | | 297/188.04 |
| 8,128,163 B2 * | 3/2012 | Alberti | ............... | B60R 5/003 |
| | | | | 297/188.08 |
| 9,016,749 B2 * | 4/2015 | Mueller | ............... | B60R 5/006 |
| | | | | 296/37.15 |
| 9,421,915 B2 * | 8/2016 | Kalergis | ............... | B60N 2/305 |
| 9,561,754 B2 | 2/2017 | Yamamoto | | |
| 10,086,766 B2 * | 10/2018 | Osterhoff | ............... | B60N 2/682 |
| 10,160,392 B2 * | 12/2018 | Line | ............... | B60N 2/206 |
| 10,336,262 B2 * | 7/2019 | Mozurkewich | ............... | B60R 7/043 |
| 2002/0005649 A1 * | 1/2002 | Hofmann | ............... | B60R 7/043 |
| | | | | 296/37.15 |
| 2007/0182230 A1 * | 8/2007 | Bhatia | ............... | B60N 2/206 |
| | | | | 297/378.1 |
| 2009/0115229 A1 * | 5/2009 | Messner | ............... | A47C 7/62 |
| | | | | 297/188.1 |
| 2010/0231011 A1 * | 9/2010 | Lindsay | ............... | B60R 7/043 |
| | | | | 297/188.11 |
| 2014/0225403 A1 * | 8/2014 | Shimada | ............... | B60R 7/043 |
| | | | | 297/188.1 |
| 2017/0036572 A1 * | 2/2017 | Hansen | ............... | B60N 2/30 |

FOREIGN PATENT DOCUMENTS

| | | |
|---|---|---|
| FR | 2778156 B1 | 7/2000 |
| JP | H07246883 A | 9/1995 |
| JP | 2006315622 A | 11/2006 |
| JP | 2012162106 A | 8/2012 |
| JP | 5066806 B2 | 11/2012 |
| JP | 6241221 B2 | 12/2017 |
| JP | 6434247 B2 | 12/2018 |

* cited by examiner

STORAGE TRAYS AND SEAT ASSEMBLIES HAVING STORAGE TRAYS

TECHNICAL FIELD

The present specification generally relates to seat assemblies and, more specifically, to seat assemblies that include storage trays that releasably engaged with the seat assembly.

BACKGROUND

It has been known to provide vehicles with storage compartments to allow occupants to store objects therein during travel. The previously known storage compartments have either been arranged within the body of the vehicle or made from a rigid material which can mount to a specific mounting point. However, when the occupant adjusts the seat, the previously known storage compartments would remain stationary as the occupant's seat moved farther away from the storage area. Additionally, when the previously known rigid storage compartments are stressed, the storage compartment may break.

Accordingly, there is a need for a storage compartment which is accessible to the occupant while the occupant is seated on the seat assembly and which is releasably connected to the seat assembly.

SUMMARY

In one embodiment, a storage tray, for a seat assembly, includes a tray portion. The seat assembly includes a seat cushion pivotally coupled to a frame. The frame includes a pair of side shields and a frame member that extends between the pair of side shields. The tray portion includes a front lip, a rear wall, and a pair of side wall portions. The front lip, the rear wall, and the pair of side wall portions define a storage area. The tray portion is disposed between and coupled to the pair of side shields by a tab that extends outwardly from each of the pair of side wall portions. The tray portion is coupled to the frame member by a hook that extends outwardly from the rear wall.

In another embodiment, a seat assembly for supporting an occupant above a floor of a vehicle includes a seat cushion, a seat back, a frame, and a storage tray. The seat back is pivotally coupled to the seat cushion. The frame is coupled to the seat cushion such that the seat cushion is pivotal with respect to the frame. The frame includes a pair of side shield and a frame member that extends between inner surfaces of the pair of side shields. The storage tray includes a tray portion having a front lip, a rear wall, and a pair of side wall portions. The front lip, the rear wall, and the pair of side wall portions defining a storage area. The tray portion is disposed between and coupled to the inner surfaces of the pair of side shields by a tab that extends outwardly from each of the pair of side wall portions. The tray portion is coupled to the frame member by a hook that extends outwardly from the rear wall.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
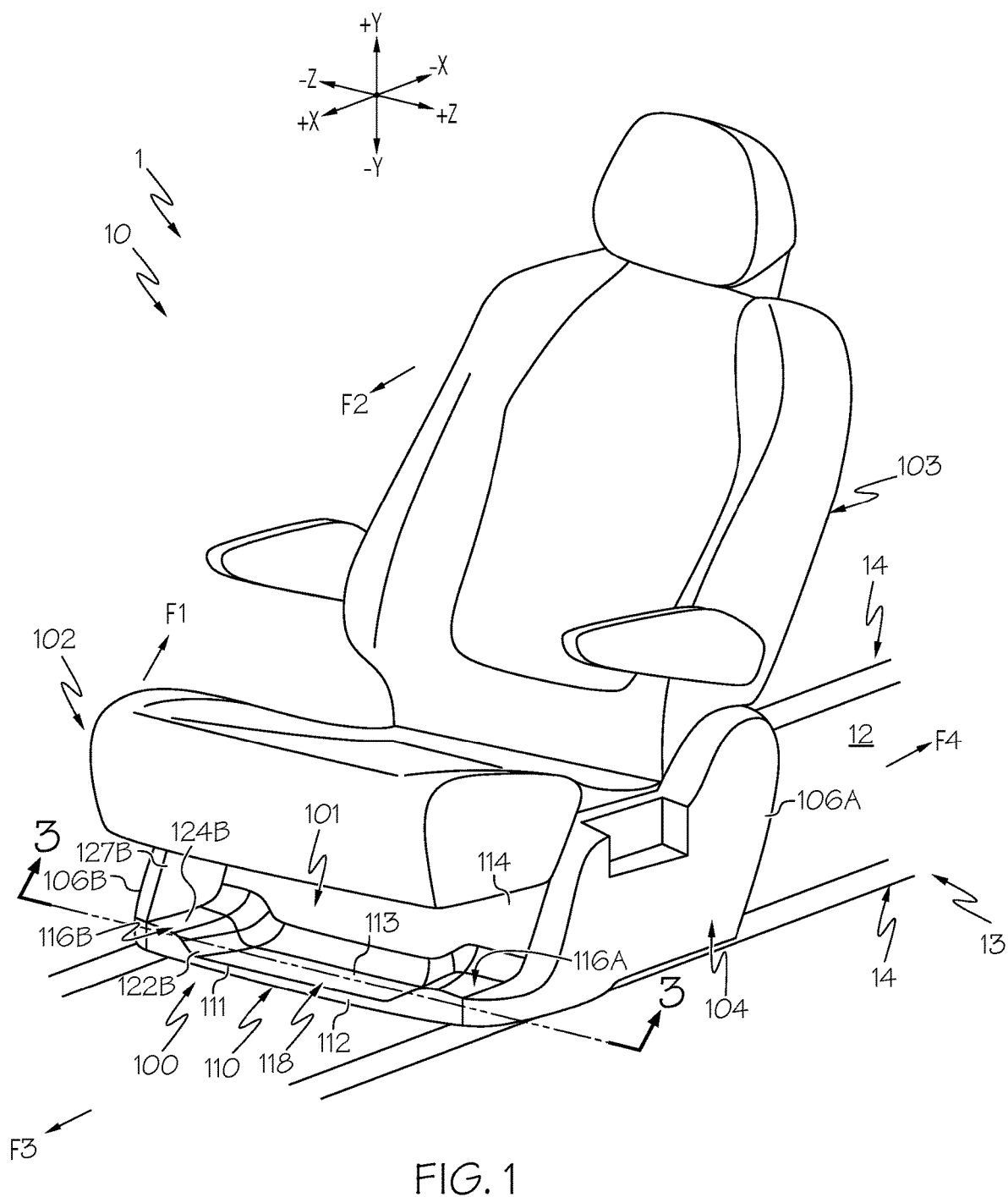
FIG. 1 schematically depicts a perspective view of a seat assembly having a storage tray according to one or more embodiments shown or described herein.

A storage tray for a seat assembly according to the present specification includes a seat cushion pivotally coupled to a frame. The frame including a pair of side shields and a frame member that extends between the pair of side shields. The storage tray comprises a tray portion having a front lip, a rear wall, and a pair of side wall portions. The front lip, the rear wall, and the pair of side wall portions define a storage area. The tray portion is disposed between and coupled to the pair of side shields by a tab that extends outwardly from each of the pair of side wall portions. The tray portion is coupled to the frame member by a hook that extends outwardly from the rear wall.

A seat assembly according to the present specification includes a seat assembly for supporting an occupant above a floor of a vehicle. The seat assembly includes a seat cushion, a seat back, a frame, and a storage tray. The seat back is pivotally coupled to the seat cushion. The frame is coupled to the seat cushion such that the seat cushion is pivotal with respect to the frame. The frame includes a pair of side shield and a frame member that extends between inner surfaces the pair of side shields. The storage tray includes a tray portion having a front lip, a rear wall, and a pair of side wall portions. The front lip, the rear wall, and the pair of side wall portions defining a storage area. The tray portion is disposed between and coupled to the inner surfaces of the pair of side shields by a tab that extends outwardly from each of the pair of side wall portions. The tray portion is coupled to the frame member by a hook that extends outwardly from the rear wall.

Various embodiments of a storage tray for a seat assembly and for operating the same will be described herein with specific reference to the appended drawings.

As used herein, the term "vehicle longitudinal direction" refers to the forward-rearward direction of the vehicle (i.e., in the +/− vehicle X-direction as depicted). The term "vehicle lateral direction" refers to the cross-vehicle direction of the vehicle (i.e., in the +/− vehicle Z-direction as depicted), and is transverse to the vehicle longitudinal direction. The term "vehicle vertical direction" refers to the upward-downward direction of the vehicle (i.e., in the +/− vehicle Y-direction as depicted). As used herein, "upper" and "above" are defined as the positive Y direction of the coordinate axis shown in the drawings. "Lower" and "below" are defined as the negative Y direction of the coordinate axis shown in the drawings. Further, the terms "outboard" as used herein refers to the relative location of a component with respect to a vehicle centerline. The term "inboard" as used herein refers to the relative location of a component with respect to the vehicle centerline. Because the vehicle structures may be generally symmetrical about the vehicle centerline, the direction to which use of terms "inboard" or "outboard" and refer may be mirrored about the vehicle centerline when evaluating components positioned along opposite sides.

Referring now to FIG. 1, a seat assembly 10 is generally depicted. In some embodiments, the seat assembly 10 is provided within a vehicle 1. In some embodiments, the vehicle 1 is a car. In some embodiments, the vehicle 1 may be a truck, a sport utility vehicle, a van, a boat, a plane, or other vehicle types.

Figure 2:
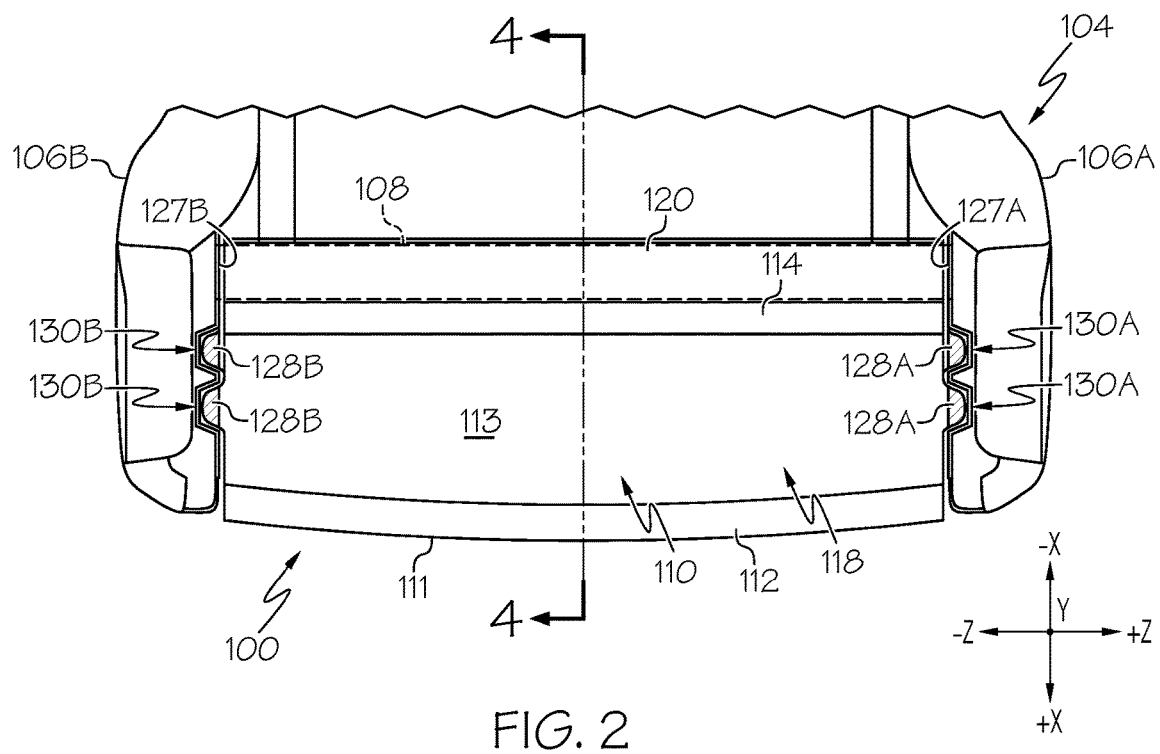
FIG. 2 schematically depicts a partial cross-sectional view of the seat assembly of FIG. 1 taken along line 2-2 of FIG. 3, according to one or more embodiments shown or described herein.
Figure 3:
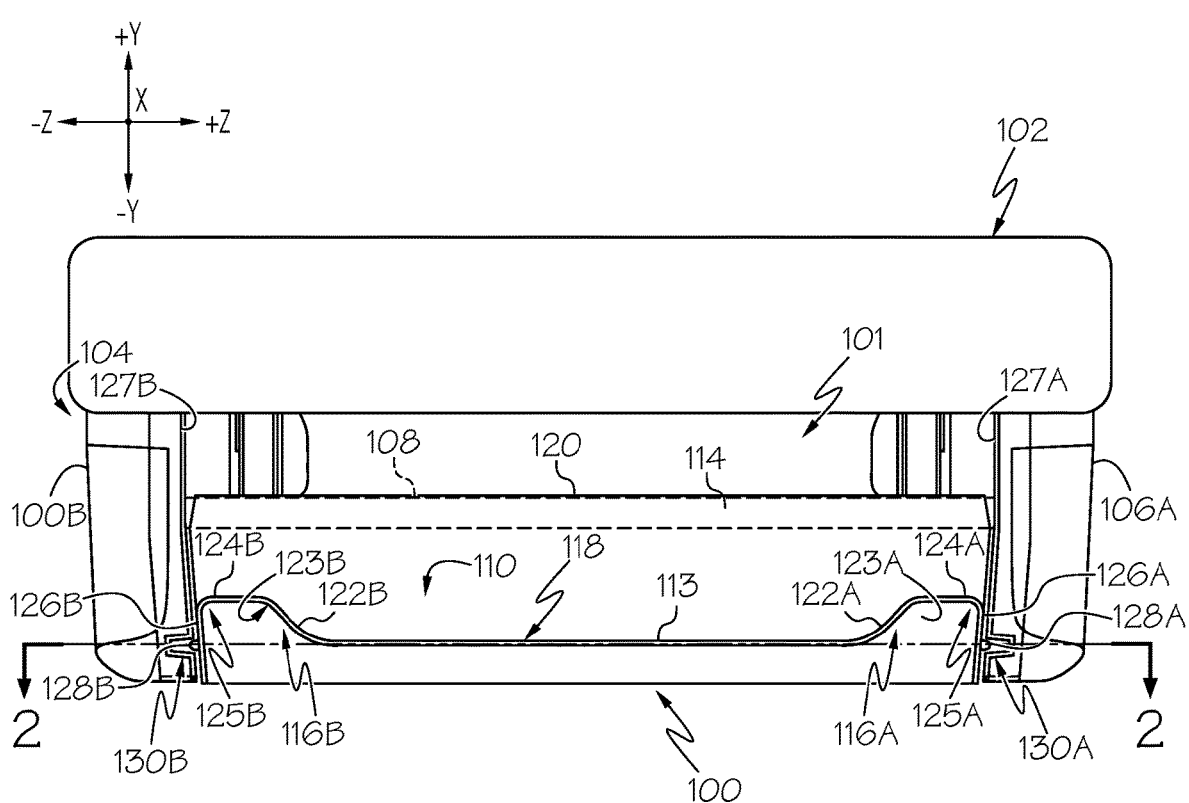
FIG. 3 schematically depicts a front cross-sectional view of the seat assembly taken along the line 3-3 of FIG. 1, according to one or more embodiments shown or described herein.

The seat assembly 10 includes a storage tray 100, a seat cushion 102, a frame 104, and a seat back 103. The frame 104 includes a pair of side shields 106A, 106B and a frame member 108 that extends between the pair of side shields 106A, 106B, as shown in FIGS. 2 and 3. The seat cushion 102 is coupled to the frame 104 such that the seat cushion 102 is pivotal with respect to the frame 104. The seat back 103 is pivotally coupled to the seat cushion 102. In some embodiments, the seat cushion 102 is pivotal between a seated position and a tip-up position. In the seated position, the seat cushion 102 is positioned so as to support an occupant above a floor 12. In the tip-up position, the seat cushion 102 is pivoted in the direction of arrow F1 towards the seat back 103.

The seat back 103 is pivotally coupled to the seat cushion 102 and/or the frame 104. In some embodiments, the seat back 103 is pivotal between a seated position and a tip-forward position. In the seated position, the seat back 103 is positioned to as to support a back of the occupant supported on the seat cushion 102 in the seated position. In the tip forward position, the seat back 103 is pivoted in the direction of arrow F2 towards the seat cushion 102.

In some embodiments, the seat assembly 10 is mounted to a track assembly 13 provided on the floor 12 of the vehicle 1. The track assembly 13 includes a pair of rails 14 embedded within the floor 12 of the vehicle 1. The track assembly 13 is slidably coupled to the frame 104 such that the seat assembly 10 is moveable in the vehicle longitudinal direction forward in the direction of arrow F3 and rearward in the direction of arrow F4. The track assembly 13 allows the seat assembly 10 to be slidably positioned along the pair of rails 14 to provide an occupant supported on the seat assembly 10 additional leg room.

In some embodiments, the seat assembly 10 is a second row seat assembly and is moveable between a use position and a walk-in position. In the use position, the seat cushion 102 is in the seated position and the seat back 103 is in the seated position. In the walk-in position, the seat cushion 102 is in the tip-up position, the seat back 103 is in the tip-forward position, and the seat assembly 10 is slid along the track assembly 13 in the direction of arrow F3 such that the seat assembly 10 is positioned farther forward in the vehicle longitudinal direction compared to when the seat assembly 10 is in the seated position.

In some embodiments, the storage tray 100 and the frame 104 are fixed relative to the movement of the seat cushion 102 between the seated position and the tip-up position and the movement of the seat back 103 between the seated position and the tip-forward position. As such, the storage tray 100 and the frame 104 remain in the same relative position with respect to the movement of the seat cushion 102 between the seated position and the tip-up position and movement of the seat back 103 between the seated position and the tip-forward position.

As will be described in greater detail below, the storage tray 100 is reliably coupled to the frame 104 such that upon sliding movement of the seat assembly 10 between the seated position and the walk-in position, the storage tray 100 moves with the seat assembly 10. Specifically, as the seat assembly 10 slides along the pair of rails 14 of the track assembly 13, the storage tray 100 remains in the same position relative to the frame 104. As will be described in greater detail below, the storage tray 100 is releasably coupled to the frame 104 such that an occupant seated in the seat assembly 10, in the use position, is permitted to access a storage area 118 of the storage tray 100 through an opening 101.

Referring to FIGS. 1-3, the storage tray 100 includes a tray portion 110 having a front lip 112, a rear wall 114, and a pair of side wall portions 116A, 116B. The front lip 112, the rear wall 114, and the pair of side wall portions 116A, 116B define the storage area 118. The storage area 118 is configured to retain objects placed therein and is accessible through the opening 101. The opening 101 extends in the vehicle vertical direction between the storage tray 100 and an underside of the seat cushion 103 and extends between a pair of side shields 106A, 106B in the vehicle lateral direction. As such, an occupant seated on the seat assembly 10 in the use position, is able to access the storage area 118 of the storage tray 100 through the opening 101.

Each of the pair of side shields 106A, 106B include an inner surface 127A, 127B. The inner surface 127A, 127B of the pair of side shields 106A, 106B face each other in the vehicle lateral direction. As shown in FIGS. 2 and 3, the frame member 108 extends between the pair of side shields 106A, 160B, specifically, the frame member 108 extends between the inner surfaces 127A, 127B of the pair of side shields 106A, 106B in the vehicle lateral direction.

Each inner surface 127A, 127B of the pair of side shields 106A, 106B includes at least one cavity 130A, 130B having a shaped configuration. In some embodiments, each inner surface 127A, 127B includes a plurality of cavities 130A, 130B such as two, three, four or more. The cavities 130A, 130B extend outwardly from the inner surface 127A, 127B in the vehicle lateral direction. In some embodiments, the plurality of cavities 130A, 130B are aligned in the vehicle longitudinal direction.

Referring to FIG. 3, the cavities 130A, 130B include a top wall, a bottom wall, a side end wall, a front wall, and a rear wall. The top wall and the bottom wall face each in the vehicle vertical direction and the rear wall and the front wall face each other in the vehicle longitudinal direction. As such, the cavities 130A, 130B are defined by the top wall, bottom wall, rear wall, front wall, and side end wall. In some embodiments, the cavities 130A, 130B are configured as openings formed in the inner surfaces 127A, 127B of the pair of side shields 106A, 106B.

Referring to FIGS. 1-3, the tray portion 110 has a generally planar bottom wall 113 from which the pair of side wall portions 116A, 116B, the rear wall 114, and the front lip 112 extend. The storage area 118 is defined by the bottom wall 113, the side wall portions 116A, 116B, the rear wall 114, and the front lip 112.

Each of the pair of side wall portions 116A, 116B includes an interior side wall 122A, 122B, a base wall 124A, 124B, and an exterior side wall 126A, 126B. The interior side walls 122A, 122B extend upwardly from lateral sides of the bottom wall 113 of the tray portion 110 in the vehicle vertical direction. The base walls 124A, 124B extend outwardly from an upper edge 123A, 123B of the interior side walls 122A, 122B in the vehicle lateral direction. The exterior side walls 126A, 126B extend downwardly from an outer edge 125A, 125B of the base walls 124A, 124B in the vehicle vertical direction.

Each of the exterior side walls 126A, 126B include at least one tab 128A, 128B. The tabs 128A, 128B extend outwardly from each of the exterior side walls 126A, 126B in the vehicle lateral direction. The tabs 128A, 128B are shaped so as to correspond to the shaped configuration of the cavities 130A, 130B, specifically, the tabs 128A, 128B are dimensioned so as to be smaller than the cavities 130A, 130B so as to be at least partially received within the cavities 130A, 130B. As will be described in greater detail below, the tabs 128A, 128B are at least partially received within the cavities 130A, 130B to couple the tray portion 110 of the storage tray 100 to the frame 104, specifically the pair of side shields 106A, 106B.

The front lip 112 extends upwardly from a front edge 111 of the tray portion 110 in the vehicle vertical direction. In some embodiments, the front lip 112 extends between the interior side walls 122A, 122B in the vehicle lateral direction. As the front lip 112 extends upwardly from the front edge 111 of the tray portion 110, such that the front lip 112 is positioned above the bottom wall 113, objects placed in the storage tray 100 are retained within the storage area 118 by the front lip 112. In the event of a deceleration, objects within the storage area 118 slide and/or roll forward in the vehicle longitudinal direction contact the front lip 112 and are retained within the storage area 118. In some embodiments, the front lip 112 extends upwardly from the bottom wall 113 of the tray portion 110, in the vehicle vertical direction, at least 30 mm, 33 mm, 35 mm or more.

In some embodiments, the storage tray 100 is dimensioned such that an occupant standing in front of the seat cushion 102 is inhibited from stepping on the storage tray 100. In some other embodiments, the storage tray 100 is dimensioned so as position the front lip 112 and/or the front edge 111 of the storage tray 100 rearward of a front edge of the seat cushion 102, in the vehicle longitudinal direction, such that a foot of an AM95 dummy is prevented from stepping on the storage tray 100. In some other embodiments, storage tray 100 is dimensioned so as position the front lip 112 and/or the front edge 111 of the storage tray 100 rearward of a front edge of the seat cushion 102, in the vehicle longitudinal direction, such that a foot of an AM95 dummy is prevented from stepping on the storage tray 100 when a shin portion of the AM95 dummy contacts the front end of the seat cushion 102.

Figure 4A:
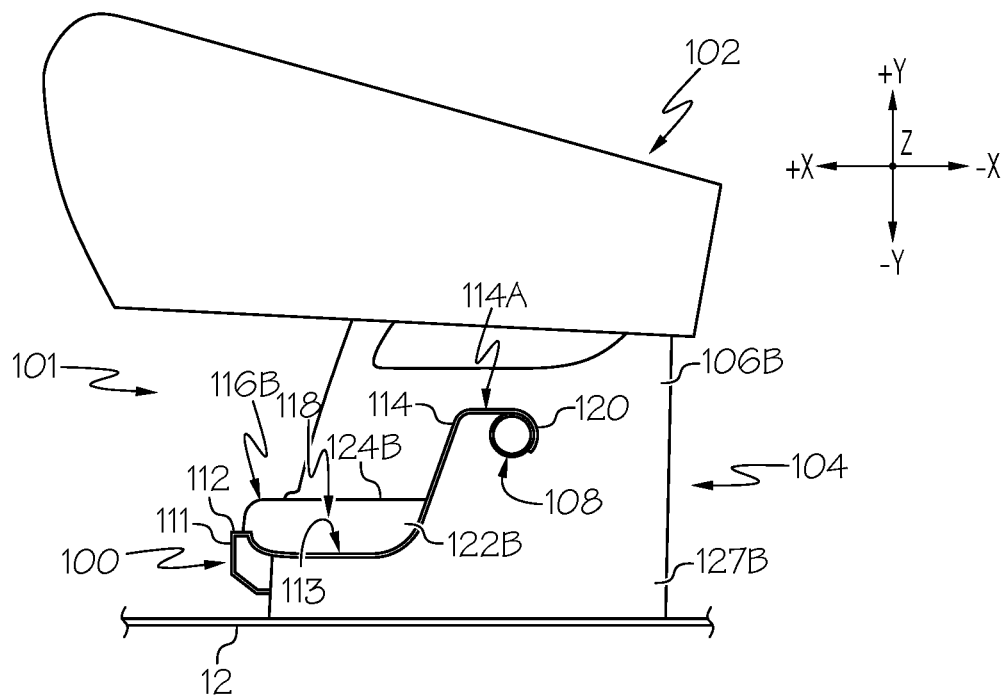
FIG. 4A schematically depicts a partial cross-sectional view of the storage tray for the seat assembly of FIG. 1 taken along the line 4-4 of FIG. 2, in which the storage tray is in an initial position, according to one or more embodiments shown or described herein.
Figure 4B:
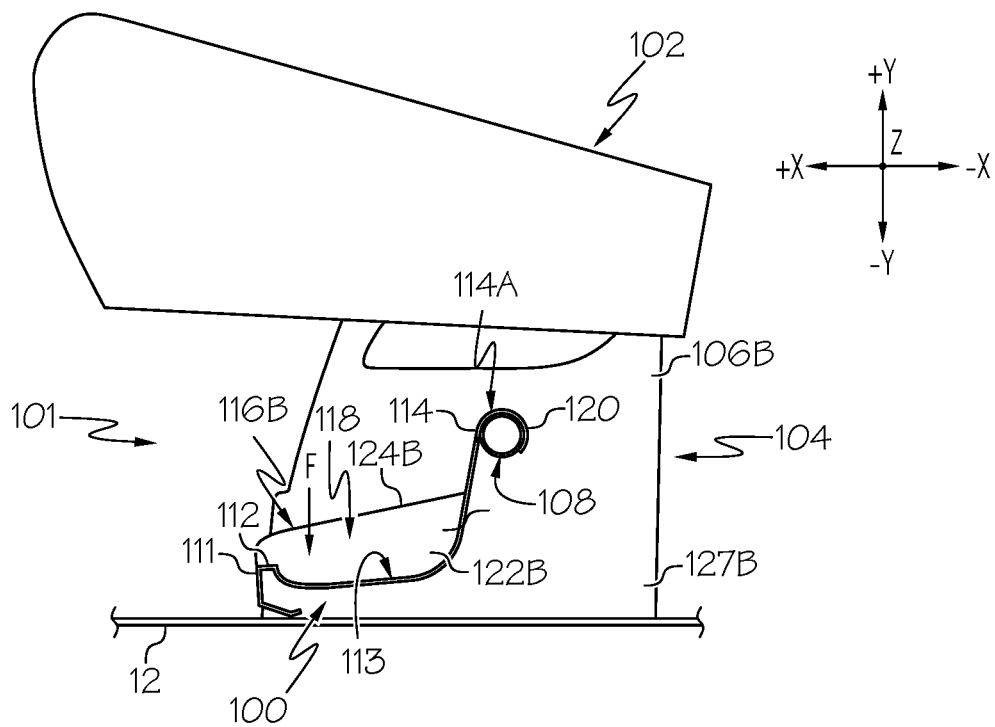
FIG. 4B schematically depicts a partial cross-sectional view of the storage tray for a seat assembly of FIG. 1 taken along the line 4-4 of FIG. 2, in which the storage tray is in a disengaged position, according to one or more embodiments shown or described herein.

Referring to FIGS. 4A and 4B, the interior side walls 122A, 122B extend between the front lip 112 and the rear wall 114 in the vehicle longitudinal direction. The rear wall 114 includes an extension portion 114A that extend in the vehicle longitudinal direction. The extension portion 114A includes a hook 120. The hook 120 has a shape that corresponds to a shape of the frame member 108. In some embodiments, the frame member 108 is a rod having a generally circular cross-sectional shape and the hook 120 is shaped to correspond to the generally circular cross-sectional shape of the frame member 108, specifically, the hook 120 is formed having a generally semicircular shape. The hook 120 at least partially surrounds the frame member 108. It should be appreciated that various cross-sectional shapes can be used for the frame member 108 and hook 120, so long as both the frame member 108 and hook 120 each have generally corresponding cross-sectional shapes such that the hook 120 may partially surround the frame member 108. As will be described in greater detail below, the hook 120 at least partially surrounds the frame member 108 to couple the tray portion 110 of the storage tray 100 to the frame 104, specifically the frame member 108.

In the some embodiments, the hook 120 extends rearwardly from the extension portion 114A of the rear wall 114, in the vehicle longitudinal direction, along an entire length of the rear wall 114 in the vehicle lateral direction. In some other embodiments, the hook 120 extends rearwardly from the extension portion 114A of the rear wall 114, in the vehicle longitudinal direction, partially along a length of the rear wall 114 in the vehicle lateral direction.

The storage tray 100 is moveable between an engaged or initial position, as shown in FIG. 4A, and a disengaged position, as shown in FIG. 4B. In the initial position, the tabs 128A, 128B are at least partially received within the cavities 130A, 130B so as to couple the storage tray 100 the pair of side shields 106A, 106B and the hook 120 at least partially surrounds the frame member 108 so as to couple the storage tray 100 to the frame member 108, as shown in FIG. 4A.

Upon application of a predetermined force F the storage tray 100 may move from the initial position towards the disengaged position. Specifically, the tray portion 110 flexibly deforms upon application of the predetermined force F such that at least one of the tabs 128A, 128B of the exterior side walls 126A, 126B disengages from the cavity 130A, 130B formed on each of the inner surfaces 127A, 127B of the pair of side shields 106A, 106B.

In the disengaged position, at least one of the tabs 128A, 128B is disengaged from corresponding cavity 130A, 130B such that the storage tray 100 is pivotal about the frame member 108. In some other embodiments, each of the tabs 128A, 128B are disengaged so as to no longer be received within the cavities 130A, 130B and the hook 120 remains at least partially surrounds the frame member 108 such that the storage tray 100 is only connected to the frame 104 by the connection of the hook 120 to the frame member 108 in the disengaged position.

In some embodiments, the storage tray 100 is removable from the frame 104 in the disengaged position such that the tabs 128A, 128B are disengaged from the cavities 130A, 130B and the hook 120 is disengaged from the frame member 108 so as to provide access to an area rearward of the frame member 108. Upon disengagement of the tabs 128A, 128B from the cavities 130A, 130B and the disengaged of the hook 120 from the frame member 108 the storage tray 100 is removable from the seat assembly 10 so as to provide access to an area rearward of the frame member 108.

As the tray portion 110 may flexibly deform upon application of the predetermined force F to the tray portion 110, the storage tray 100 is releasably coupled to the frame 104 such that during use or adjustment, and an occupant may move the tray portion 110 from the disengaged position to the initial position after a deformation occurs. Additionally, during the application of the force F, hook 120 may deform such that a portion of the extension portion 114A contacts a portion of the frame member 108 and/or the hook 120 slides with respect to the frame member 108.

By providing the storage tray 100 to partially disengage from the frame 104 due to the disengagement of the tabs 128A, 128B from the cavities 130A, 130B while at least partially retaining the engagement of the hook 120 with the frame member 108 (partial disengaged position) or an entire disengagement from the frame 104 due to the disengagement of the tabs 128A, 128B from the cavities 130A, 130B and the disengagement of the hook 120 from the frame member 108 (entire disengaged position), the storage tray 100 may receive the predetermined force F without breaking. As such, the storage tray 100 is configured to be moved from the disengaged position, including the partial disengaged position or entire disengaged position, to the initial position upon reengagement of the tabs 128A, 128B into the cavities 130A, 130B or upon reengagement of the tabs 128A, 128B into the cavities 130A, 130B and the reengagement of the hook 120 with the frame member 108.

In some embodiments, the storage tray 100 is made from a flexible resin. In some embodiments, the storage tray 100 is a one piece monolithic structure in which the tray portion 110, the bottom wall 113, the front lip 112, the pair of side wall portions 116A, 116B, and the rear wall 114 are integrally molded as a one piece monolithic structure.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A storage tray for a seat assembly having a seat cushion pivotally coupled to a frame, the frame includes a pair of side shields and a frame member that extends between the pair of side shields, the storage tray comprising:
    a tray portion having a front lip, a rear wall, and a pair of side wall portions, the front lip, the rear wall, and the pair of side wall portions define a storage area, the tray portion is disposed between and coupled to the pair of side shields by a tab that extends outwardly from each of the pair of side wall portions, the tray portion is coupled to the frame member by a hook that extends outwardly from the rear wall.

2. The storage tray of claim 1, wherein each of the pair of side shields include an inner wall, each inner wall of the pair of side shields includes a cavity, wherein the tab of each of the pair of side wall portions engages within the cavity formed on each inner wall of the pair of side wall portions to couple the tray portion to the pair of side shields.

3. The storage tray of claim 2, wherein each of the pair of side wall portions includes an interior side wall, a base wall, and an exterior side wall, the interior side walls extend upwardly from the tray portion, the base walls extend outwardly from an upper edge of the interior side walls, and the exterior side walls extend downwardly from an outer edge of the base walls, and
    wherein the tab extends outwardly from each of the exterior side walls.

4. The storage tray of claim 3, wherein the front lip extends upwardly along a front edge of the tray portion.

5. The storage tray of claim 4, wherein the interior side walls extend between the front lip and the rear wall.

6. The storage tray of claim 5, wherein the hook of the rear wall has a shape that corresponds to a shape of the frame member, and the hook at least partially surrounds the frame member.

7. The storage tray of claim 6, wherein the frame member has a generally circular cross-sectional shape and the hook has a generally semicircular shape such that the hook at least partially surrounds the frame member.

8. The storage tray of claim 7, wherein the tray portion flexibly deforms upon application of a predetermined force such that at least one tab of the exterior side walls disengages from the cavity formed on each of the inner walls of the pair of side shields.

9. A seat assembly for supporting an occupant above a floor of a vehicle, the seat assembly comprising:
    a seat cushion;
    a seat back pivotally coupled to the seat cushion;
    a frame coupled to the seat cushion such that the seat cushion is pivotal with respect to the frame, the frame includes a pair of side shield and a frame member that extends between inner surfaces of the pair of side shields; and
    a storage tray comprising:
        a tray portion having a front lip, a rear wall, and a pair of side wall portions, the front lip, the rear wall, and the pair of side wall portions define a storage area, the tray portion is disposed between and coupled to the inner surfaces of the pair of side shields by a tab that extends outwardly from each of the pair of side wall portions, the tray portion is coupled to the frame member by a hook that extends outwardly from the rear wall.

10. The seat assembly of claim 9, wherein each of the pair of side shields include an inner wall, each inner wall of the pair of side shields includes a cavity, wherein the tab of each of the pair of side wall portions engages within the cavity formed on each inner wall of the pair of side wall portions to couple the tray portion to the pair of side shields, and
    wherein each of the pair of side wall portions includes an interior side wall, a base wall, and an exterior side wall, the interior side walls extend upwardly from the tray portion, the base walls extend outwardly from an upper edge of the interior side walls, and the exterior side walls extend downwardly from an outer edge of the base walls, and
    wherein the tab extends outwardly from each of the exterior side walls.

* * * * *